United States Patent
Iwata et al.

(10) Patent No.: US 11,656,085 B2
(45) Date of Patent: May 23, 2023

(54) ROUTE SEARCHING DEVICE AND COMPUTER PROGRAM

(71) Applicant: TOYOTA JIDOSHA KABUSHIKI KAISHA, Toyota (JP)

(72) Inventors: Tominori Iwata, Aichi (JP); Yusuke Kawabata, Aichi (JP); Tetsuo Kumagai, Aichi (JP); Xin Jin, Aichi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 16/821,147

(22) Filed: Mar. 17, 2020

(65) Prior Publication Data
US 2020/0333149 A1 Oct. 22, 2020

(30) Foreign Application Priority Data

Apr. 17, 2019 (JP) .............................. JP2019-078300

(51) Int. Cl.
*G01C 21/34* (2006.01)
*G06Q 10/047* (2023.01)

(52) U.S. Cl.
CPC ....... *G01C 21/3461* (2013.01); *G01C 21/343* (2013.01); *G01C 21/3446* (2013.01); *G06Q 10/047* (2013.01)

(58) Field of Classification Search
CPC .............. G06Q 10/047; G01C 21/3446; G01C 21/343; G01C 21/3461
See application file for complete search history.

(56) References Cited

U.S. PATENT DOCUMENTS

| 7,319,931 | B2 * | 1/2008 | Uyeki | G08G 1/096844 |
| | | | | 701/423 |
| 7,376,509 | B2 * | 5/2008 | Endo | G08G 1/0104 |
| | | | | 340/995.13 |
| 7,671,764 | B2 * | 3/2010 | Uyeki | G08G 1/096844 |
| | | | | 340/995.13 |
| 8,831,873 | B2 * | 9/2014 | Tamayama | G01C 21/3484 |
| | | | | 701/428 |
| 8,918,279 | B2 * | 12/2014 | Yonezawa | G08G 1/096811 |
| | | | | 340/995.13 |
| 9,239,242 | B2 * | 1/2016 | Okude | G08G 1/09685 |
| 9,404,761 | B2 * | 8/2016 | Meuleau | G01C 21/3469 |
| 9,766,082 | B2 * | 9/2017 | Koshizen | G01C 21/3691 |
| 10,197,405 | B2 * | 2/2019 | Sato | G05D 1/0088 |
| 10,281,287 | B2 * | 5/2019 | Yanagihara | G01C 21/34 |
| 10,309,790 | B2 * | 6/2019 | Konishi | G01C 21/34 |

(Continued)

FOREIGN PATENT DOCUMENTS

| JP | H11-83516 A | 3/1999 |
| JP | 2004-264220 A | 9/2004 |
| JP | 2011-227043 A | 11/2011 |

*Primary Examiner* — Yazan A Soofi
(74) *Attorney, Agent, or Firm* — Sughrue Mion, PLLC

(57) ABSTRACT

Location data is obtained in which an arrival link from which a vehicle can enter a location serving as a destination and an arrival link direction are associated with the location, the arrival link direction indicating a direction in which the vehicle can enter upon entering the location from the arrival link. A cost related to the arrival link is corrected based on the obtained location data. A route to the destination is searched for, using the corrected cost related to the arrival link.

18 Claims, 12 Drawing Sheets

(56) References Cited

U.S. PATENT DOCUMENTS

| | | | | |
|---|---|---|---|---|
| 10,423,899 B2* | 9/2019 | Zhou | ................... | G06Q 10/047 |
| 2004/0225437 A1* | 11/2004 | Endo | ................ | G08G 1/096716 |
| | | | | 701/415 |
| 2007/0106465 A1* | 5/2007 | Adam | .............. | G08G 1/096883 |
| | | | | 701/533 |
| 2009/0171563 A1* | 7/2009 | Morimoto | .......... | G01C 21/3685 |
| | | | | 701/533 |
| 2010/0114466 A1* | 5/2010 | Tomita | ............... | G01C 21/3461 |
| | | | | 701/532 |
| 2010/0332121 A1* | 12/2010 | Okude | ............... | G01C 21/3415 |
| | | | | 701/533 |
| 2011/0282576 A1* | 11/2011 | Cabral | ................ | G08G 1/09675 |
| | | | | 701/533 |
| 2015/0168171 A1* | 6/2015 | Tanizaki | ............ | G01C 21/3461 |
| | | | | 701/426 |
| 2016/0209845 A1* | 7/2016 | Kojo | .................... | G05D 1/0217 |
| 2016/0238404 A1* | 8/2016 | Okada | ................ | G01C 21/3658 |
| 2017/0350715 A1* | 12/2017 | Tanizaki | ................ | G01C 21/34 |
| 2019/0120640 A1* | 4/2019 | Ho | .................... | G01C 21/3461 |

* cited by examiner

ROUTE SEARCHING DEVICE AND COMPUTER PROGRAM

INCORPORATION BY REFERENCE

The disclosure of Japanese Patent Application No. 2019-078300 filed on Apr. 17, 2019, including the specification, drawings and abstract is incorporated herein by reference in its entirety.

BACKGROUND OF THE DISCLOSURE

(1) Field of the Disclosure

Aspects of the present disclosure relate to a route searching device and a computer program that search for a route using costs.

(2) Description of Related Art

In recent years, a navigation device that provides guidance on vehicle travel so that a driver can easily arrive at a desired destination has been often mounted on a vehicle. Here, the navigation device is a device that can detect a current location of the vehicle by a GPS receiver, etc., obtain map data corresponding to the current location through a recording medium such as a DVD-ROM or an HDD or a network, and display the map data on a liquid crystal monitor. Furthermore, the navigation device has a route search function of searching for an optimal route from a point of departure (e.g., a current location of the vehicle) to a desired destination when the destination is inputted. The navigation device sets the searched optimal route as a guided route, displays the guided route on a display screen, and provides audio guidance when, for example, the vehicle has approached an intersection, by which a user is securely guided to the desired destination. In addition, in recent years, there have also been mobile phones, smartphones, tablet terminals, personal computers, etc., that have the same function as the above-described navigation device.

Here, when a route to a destination is searched for, particularly, when the destination is located along a highway such as a prefectural highway or a national highway, it is important to determine in which direction the vehicle arrives at the destination on a route. For example, when, as shown in FIG. 12, a destination 101 is located along a highway with a six-lane road, it is easy to enter the destination by making a left turn, but it is difficult to enter the destination by making a right turn (in a case of a country that drives on the left side of the road). Particularly, when there is a median strip at a location facing the destination 101, it is practically impossible to enter the destination 101 by making a right turn. On the other hand, if there is no median strip at a location facing the destination 101, it is also possible to enter the destination 101 by making a right turn. In view of this, JP 2004-264220 A (pp. 6-8) discloses a technique in which map information includes information identifying whether there is a median strip on a road and identifying breaks in the median strip, a direction in which a vehicle can enter a destination is identified based on the state of a median strip present around the destination, and a route according to the identified direction is searched for.

SUMMARY OF THE DISCLOSURE

However, in the technique disclosed in the above-described JP 2004-264220 A (pp. 6-8), in order to identify a direction in which the vehicle can enter the destination, precise information about a median strip is required. Namely, information is required that identifies the location and size of a break in a median strip present on a link. However, it is realistically difficult to allow all links included in map information to have such precise information about a median strip. In addition, the amount of data of map information increases, and furthermore, the amount of information to be referred to upon a route search increases, and thus, a processing load associated with the route search also increases.

Meanwhile, the above-described JP 2004-264220 A (pp. 6-8) also discloses a technique in which, when precise information about a median strip cannot be obtained, it is estimated whether there is a break in a median strip at a location facing a destination, using the percentage of the median strip occupied in the entire link or the size of a facility serving as the destination. However, with such a method, it cannot be accurately identified whether a break in the median strip is actually present at a location facing the destination. Therefore, there has been a possibility that an optimal route to the destination cannot be searched for.

The aspects of the present disclosure were made to solve the above-described conventional problem, and provide a route searching device and a computer program that enable to perform a route search, taking into account a direction in which a vehicle can enter a destination, without significantly increasing the amount of data or a processing load associated with the route search, by including, in location information of a location that can serve as the destination, an arrival link from which the vehicle can enter the location and an arrival link direction indicating a direction in which the vehicle can enter upon entering the location from the arrival link.

In order to provide the above-described route searching device, a route searching device according to the present disclosure performs a route search using costs related to links included in a route, and includes: a location information obtaining unit for obtaining location information in which an arrival link from which a vehicle can enter a location serving as a destination and an arrival link direction are associated with the location, the arrival link direction indicating a traveling direction of the arrival link in which the vehicle can enter upon entering the location from the arrival link; a cost correcting unit for correcting a cost related to the arrival link, based on the location information; and a route searching unit for searching for a route to the destination, using the cost related to the arrival link, the cost being corrected by the cost correcting unit.

Note that the "location" includes, in addition to a facility, a point (e.g., a place name or an address) other than a facility on a map that can serve as a destination.

Note also that the "cost related to the arrival link" includes one or both of the link cost of the arrival link and the node costs set at end portions of the arrival link.

In addition, a computer program according to the present disclosure allows to perform a route search using costs related to links included in a route. Specifically, the computer program causes a computer to function as: a location information obtaining unit for obtaining location information in which an arrival link from which a vehicle can enter a location serving as a destination and an arrival link direction are associated with the location, the arrival link direction indicating a traveling direction of the arrival link in which the vehicle can enter upon entering the location from the arrival link; a cost correcting unit for correcting a cost related to the arrival link, based on the location information;

and route searching unit for searching for a route to the destination, using the cost related to the arrival link, the cost being corrected by the cost correcting unit.

According to the route searching device and the computer program according to the present disclosure that have the above-described configurations, location information of a location that can serve as a destination has an arrival link from which the vehicle can enter the location and an arrival link direction indicating a traveling direction of the arrival link in which the vehicle can enter upon entering the location from the arrival link, by which it becomes possible to perform a route search, taking into account a direction in which the vehicle can enter the destination, without significantly increasing the amount of data or a processing load associated with the route search. As a result, it becomes possible to perform a more optimal route search to the destination.

DETAILED DESCRIPTION OF PREFERRED EMBODIMENTS

Figure 1:
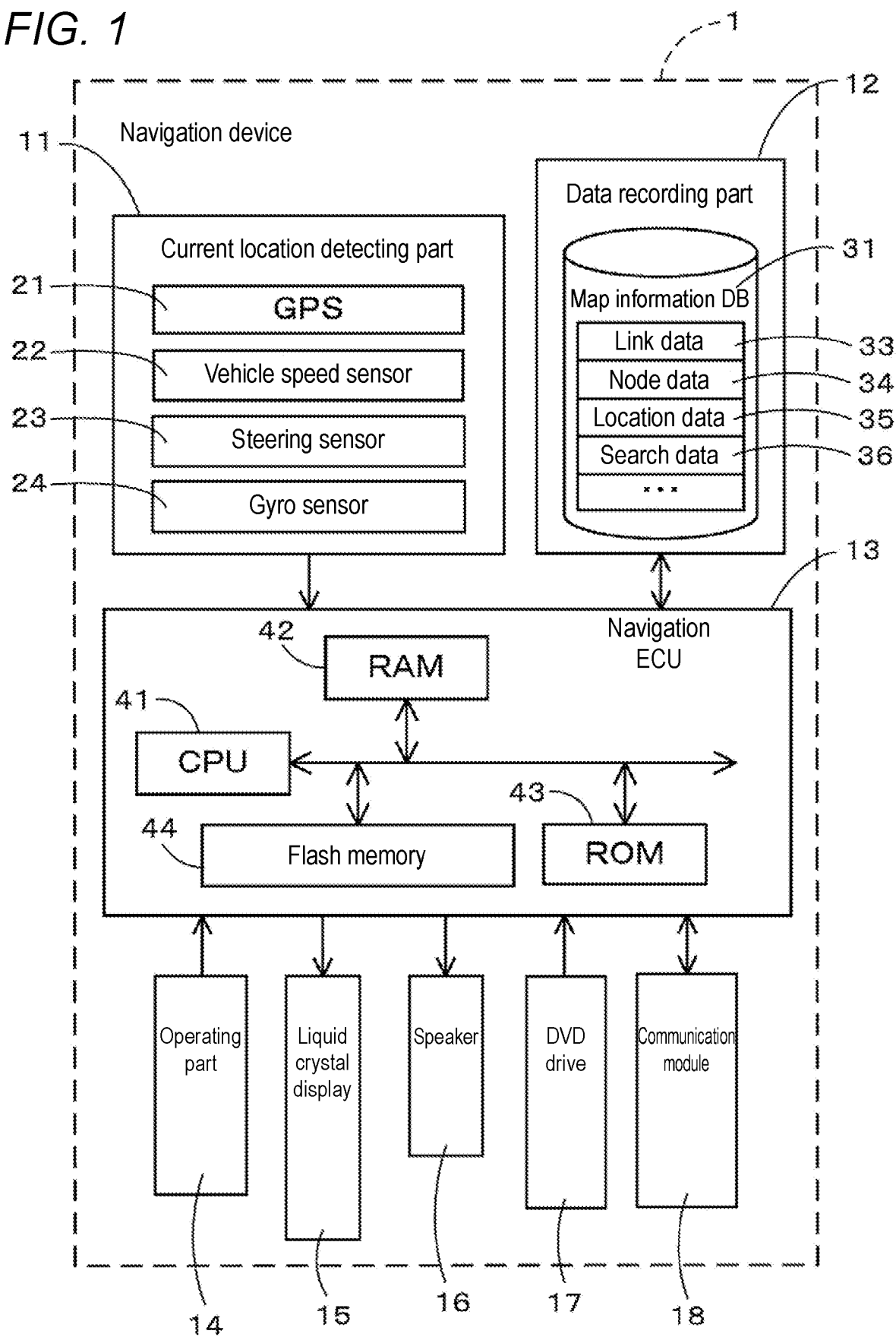
FIG. 1 is a block diagram showing a configuration of a navigation device according to the present embodiment.

A route searching device according to the present disclosure will be described in detail below based on one embodiment in which the route searching device is embodied as a navigation device and with reference to the drawings. First, a schematic configuration of a navigation device 1 according to the present embodiment will be described using FIG. 1. FIG. 1 is a block diagram showing the navigation device 1 according to the present embodiment.

As shown in FIG. 1, the navigation device 1 according to the present embodiment includes a current location detecting part 11 that detects a current location of a vehicle having the navigation device 1 mounted thereon; a data recording part 12 having various types of data recorded therein; a navigation ECU (Electronic Control Unit) 13 that performs various types of arithmetic processing based on inputted information; an operating part 14 that accepts operations from a user; a liquid crystal display 15 that displays a map of an area around the vehicle, route information about a route searched by a route search process which will be described later, etc., to the user; a speaker 16 that outputs audio guidance regarding route guidance; a DVD drive 17 that reads DVDs which are storage media; and a communication module 18 that performs communication with information centers such as a probe center and a VICS (registered trademark: Vehicle Information and Communication System) center.

Each component included in the navigation device 1 will be described below in turn.

The current location detecting part 11 includes a GPS 21, a vehicle speed sensor 22, a steering sensor 23, a gyro sensor 24, etc., and can detect the current vehicle location and orientation, vehicle travel speed, current time, etc. Here, particularly, the vehicle speed sensor 22 is a sensor for detecting the movement distance and vehicle speed of the vehicle, and generates pulses according to the rotation of drive wheels of the vehicle and outputs a pulse signal to the navigation ECU 13. Then, the navigation ECU 13 calculates the rotational speed and movement distance of the drive wheels by counting the generated pulses. Note that the navigation device 1 does not need to include all of the above-described four types of sensors, and may be configured to include only one or a plurality of types of sensors among those sensors.

In addition, the data recording part 12 includes a hard disk (not shown) serving as an external storage device and a recording medium; and a recording head (not shown) which is a driver for reading a map information DB 31, a predetermined program, etc., which are recorded on the hard disk, and writing predetermined data to the hard disk. Note that the data recording part 12 may be composed of a nonvolatile memory, a memory card, or an optical disc such as a CD or a DVD, instead of a hard disk. Note also that the map information DB 31 may be configured to be stored in an external server, and obtained by the navigation device 1 by communication.

Here, the map information DB 31 is storage device having stored therein, for example, link data 33 about roads (links), node data 34 about node points, location data 35 about locations such as facilities, search data 36 used in a process related to a route search, intersection data about each intersection, map display data for displaying a map, and retrieval data for retrieving a location.

In addition, for the link data 33, the following data is recorded. Specifically, for each link forming a road, data is recorded that represents the width and gradient of the road to which the link belongs, whether there is a median strip, a cant, a bank, the state of a road surface, the number of lanes on the road, a location where the number of lanes decreases, a location where the width becomes narrower, a railroad crossing, etc. For a corner, data is recorded that represents the radius of curvature, an intersection, a T-junction, the entry and exit of the corner, etc. For road attributes, data is recorded that represents a downhill slope, an uphill slope, etc. For the type of road, data is recorded that represents a toll road such as a national expressway, an urban expressway, a general toll road, and a toll bridge, in addition to a general road such as a national highway, a prefectural highway, and a narrow street.

In addition, for the node data 34, there is recorded, for example, data about the coordinates (locations) of actual road divergence points (also including intersections, T-junctions, etc.) and of node points that are set every predetermined distance for each road based on the radius of curvature, etc., node attributes indicating, for example, whether nodes correspond to intersections, a connected link number list which is a list of link numbers of links each connected to a node, an adjacent node number list which is a list of node numbers of nodes each adjacent to a node through a link, the height (altitude) of each node point, etc.

In addition, for the location data 35, there is stored information about locations that serve as a point of departure, a destination, a guidance target, etc., on the navigation device 1. The information corresponds, for example, to information about facilities, e.g., accommodations such as hotels and inns, fueling facilities such as gas stations, commercial establishments such as shopping malls, supermarkets, shopping centers, and convenience stores, entertainment facilities such as theme parks and amusement arcades, eating and drinking facilities such as restaurants, bars, and taverns, parking facilities such as public parking lots, traffic facilities, religious facilities such as temples and churches, and public facilities such as art museums and museums. Note that locations whose information is stored in the location data 35 also include, in addition to the above-described various types of facilities, points (e.g., place names and addresses) other than facilities on a map that can serve as a point of departure, a destination, a guidance target, etc. Note, however, that in the following, particularly, a case in which locations that serve as a point of departure, a destination, a guidance target, etc., on the navigation device 1 are facilities will be described as an example.

Each piece of location data 35 includes information about, for example, the facility name, address, phone number, representative point, and arrival point of a corresponding facility. The "representative point" is location coordinates representing a location where the facility is located (e.g., the center of the facility), and the "arrival point" is location coordinates representing a location that is an end of a route on a link, when the facility serves as a destination. For example, a point of intersection of a perpendicular line drawn from the entrance or center of a facility toward a link that the facility faces and the link is an arrival point. Note that basically only one representative point is present for a single facility, but since a large-scale facility has a plurality of entrances, there may be a plurality of arrival points for a single facility. Note also that when a facility faces dual lines (a road that has links divided for each traveling direction), arrival points are present for each link, and thus, there are also a plurality of arrival points. Furthermore, an arrival point is stored so as to be associated with an arrival link indicating a link on which the vehicle can enter a facility from the arrival point (corresponding to a link including the arrival point) and an arrival link direction indicating a direction of the arrival link in which the vehicle can enter upon entering the facility from the arrival point. A facility having a plurality of arrival points is associated with arrival links and arrival link directions for each arrival point.

FIGS. 2 to 5 are diagrams showing examples of location data 35.

Figure 2:
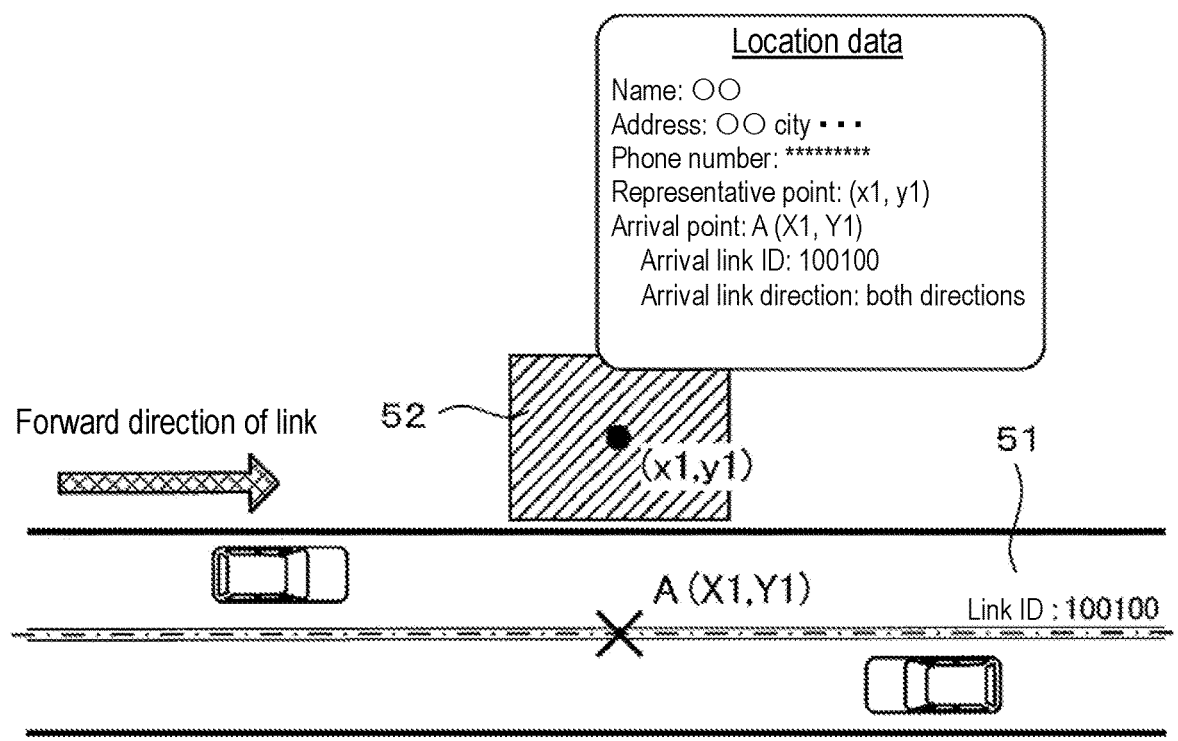
FIG. 2 is a diagram showing an example of location data.

For example, FIG. 2 shows location data 35 of a facility 52 located along a two-lane road 51 with no median strip. In the location data of the facility 52 shown in FIG. 2, an arrival point A (X1, Y1) is associated as an arrival point of the facility 52. The arrival point A is located at a location that is on a link (link ID: 100100) corresponding to the road 51 and that faces the facility 52. In addition, "link ID: 100100" is associated as information identifying an arrival link. Furthermore, since the facility 52 is a facility that the vehicle can enter in both forward and backward directions of the link, "both directions" is associated as an arrival link direction. As a result, it becomes possible to identify, from the location data, that the facility 52 is a location that the vehicle can enter from both forward and backward directions of the link with the "link ID: 100100".

Figure 3:
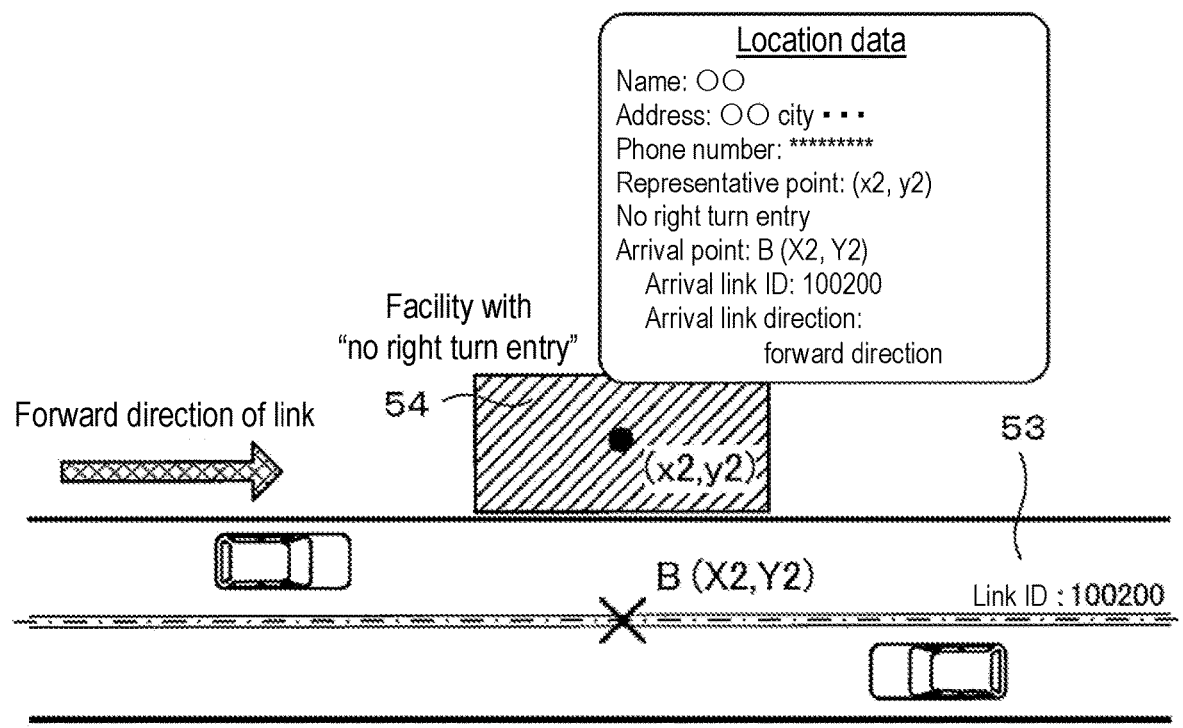
FIG. 3 is a diagram showing an example of location data.

In addition, FIG. 3 shows location data 35 of a facility 54 located along a two-lane road 53 with no median strip as in FIG. 2, but particularly shows a case in which the facility 54 sets "no right turn entry" as a house rule. In the location data of the facility 54 shown in FIG. 3, an arrival point B (X2, Y2) is associated as an arrival point of the facility 54. The arrival point B is located at a location that is on a link (link ID: 100200) corresponding to the road 53 and that faces the facility 54. In addition, "link ID: 100200" is associated as information identifying an arrival link. Furthermore, the facility 54 is a facility that the vehicle can enter in either of the forward and backward directions of the link in terms of the structure of the road, but does not allow a right turn entry, and thus, a "forward direction" which is an entry direction for entering from the arrival link by making a left turn is associated as an arrival link direction. As a result, it becomes possible to identify, from the location data, that the facility 54 is a location that the vehicle can enter only in the forward direction of the link with the "link ID: 100200". Note that although in the example shown in FIG. 3, the location data 35 includes information indicating that the facility 54 is a facility with "no right turn entry", it is also possible not to include such information in the location data 35.

Figure 4:
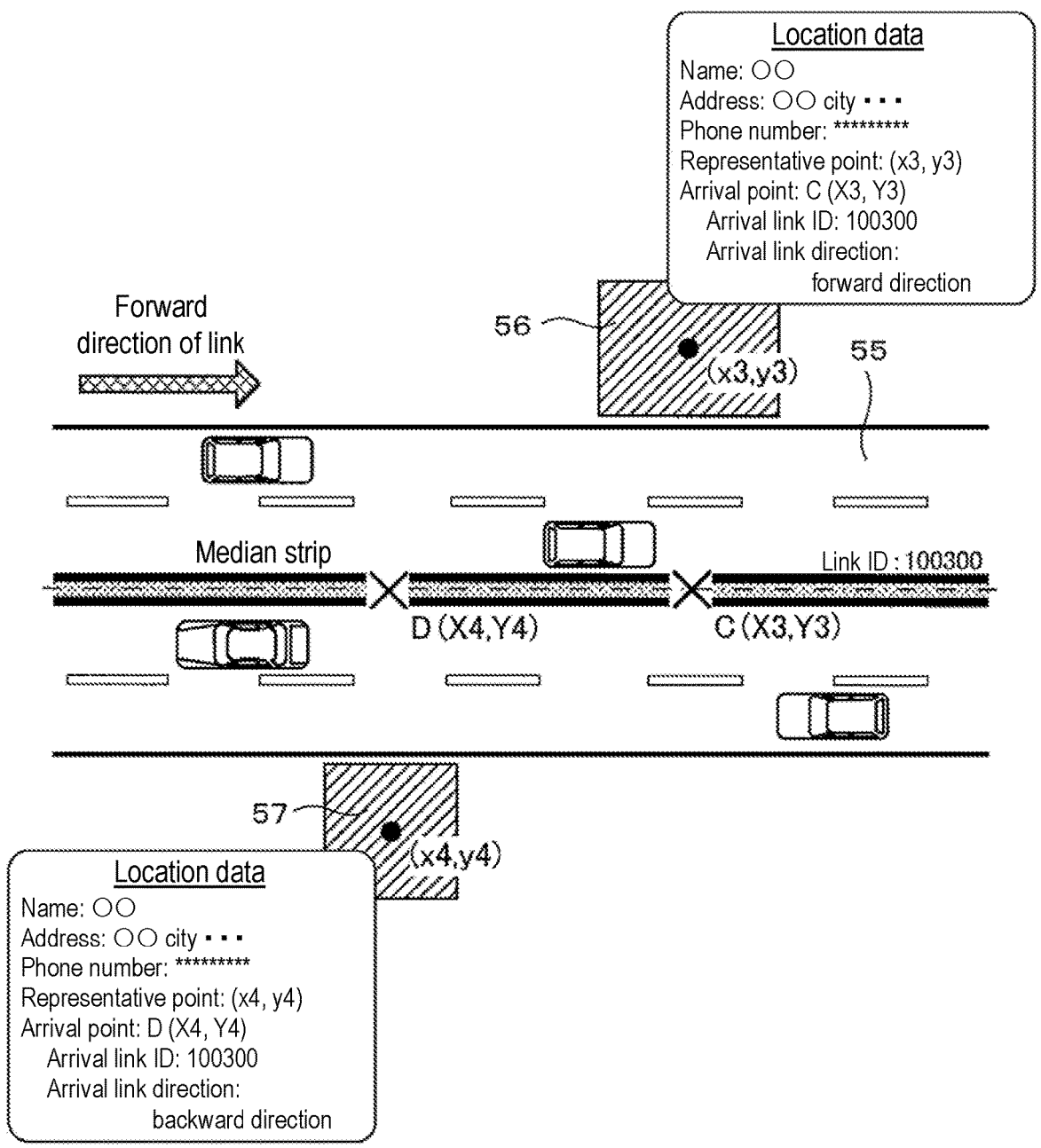
FIG. 4 is a diagram showing an example of location data.

Next, FIG. 4 shows location data 35 of each of a facility 56 and a facility 57 located along a four-lane road 55 with a median strip. In the location data of the facility 56 shown in FIG. 4, an arrival point C (X3, Y3) is associated as an arrival point of the facility 56. The arrival point C is located at a location that is on a link (link ID: 100300) corresponding to the road 55 and that faces the facility 56. In addition, "link ID: 100300" is associated as information identifying an arrival link. Furthermore, the vehicle can enter the facility 56 in a forward direction of the link, but it is very difficult for the vehicle to enter the facility 56 in a backward direction due to the median strip. Thus, the "forward direction" is associated as an arrival link direction. As a result, it becomes possible to identify, from the location data, that the facility 56 is a location that the vehicle can enter only in the forward direction of the link with the "link ID: 100300".

On the other hand, in the location data of the facility 57 shown in FIG. 4, an arrival point D (X4, Y4) is associated as an arrival point of the facility 57. The arrival point D is located at a location that is on the link (link ID: 100300) corresponding to the road 55 and that faces the facility 57. In addition, "link ID: 100300" is associated as information identifying an arrival link. Furthermore, the vehicle can enter the facility 57 in the backward direction of the link, but it is very difficult for the vehicle to enter the facility 57 in the forward direction due to the median strip. Thus, the "backward direction" is associated as an arrival link direction. As a result, it becomes possible to identify, from the location data, that the facility 57 is a location that the vehicle can enter only in the backward direction of the link with the "link ID: 100300".

Figure 5:
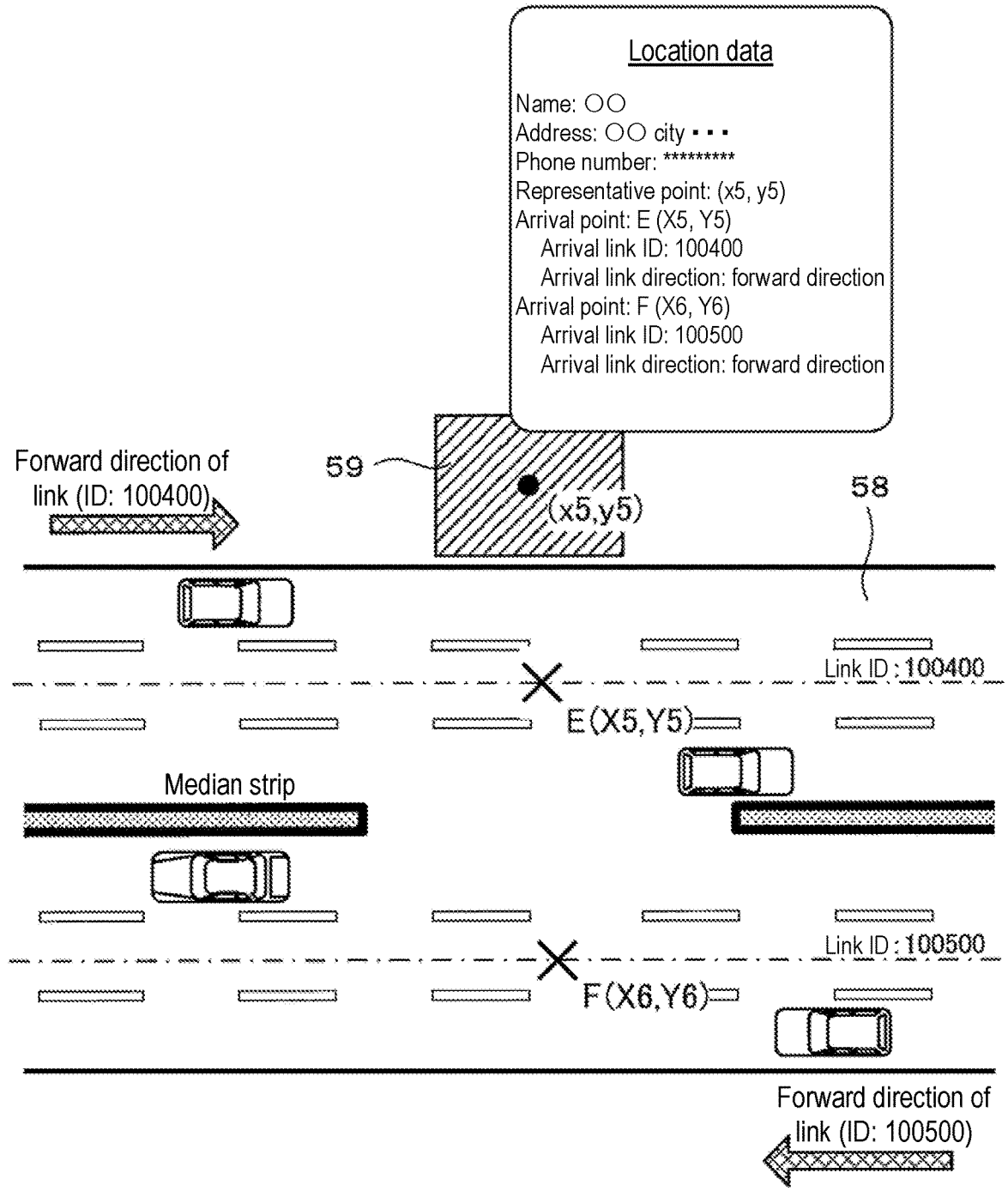
FIG. 5 is a diagram showing an example of location data.

Next, FIG. 5 shows location data 35 of a facility 59 located along a six-lane road 58 that has a median strip but has a break in the median strip in front of the facility. In addition, the road 58 is a road corresponding to dual lines in which links are divided for each traveling direction. In the location data of the facility 59 shown in FIG. 5, an arrival point E (X5, Y5) and an arrival point F (X6, Y6) are associated as arrival points of the facility 59. The arrival point E is located at a location that is on one of two links forming the road 58 (link ID: 100400) and that faces the facility 59. The arrival point F is located at a location that is on the other link (link ID: 100500) and that faces the facility 59 likewise. In addition, the arrival point E is associated with "link ID: 100400" as information identifying an arrival link. The arrival point F is associated with "link ID: 100500" as information identifying an arrival link. Furthermore, since there is no median strip at a location on the road 58 facing the facility 59, the vehicle can enter the facility 59 from both links. However, since the links can allow the vehicle to travel only in their forward directions, the "forward direction" is associated with both the arrival point E and the arrival point F as arrival link directions. As a result, it becomes possible to identify, from the location data, that the facility 59 is a location that the vehicle can enter in both the forward direction of the link with the "link ID: 100400" and the forward direction of the link with the "link ID: 100500".

Then, in the present embodiment, the navigation device 1 performs a route search, taking into account particularly an arrival link and an arrival link direction in location data 35 of a location serving as a destination, as will be described later. Details will be described later.

In addition, for search data 36, there are recorded various types of data used in a route search process for searching for a route from a point of departure (e.g., a current location of the vehicle) to a set destination, as will be described later. Specifically, there is stored cost calculation data used to calculate search costs such as a cost obtained by converting the degree of appropriateness of an intersection as a route into a numerical value (hereinafter, referred to as intersection cost or node cost), and a cost obtained by converting the degree of appropriateness of a link forming a road, as a route into a numerical value (hereinafter, referred to as link cost).

Here, the intersection cost (node cost) is set for each node corresponding to an intersection which is included in a route and which is a search cost calculation target, and the value of the intersection cost is calculated based on whether there is a traffic light, a travel route of the vehicle (i.e., types including straight ahead, a right turn, and a left turn) upon passing through the intersection, etc. In addition, the link cost is set for each link which is included in a route and which is a search cost calculation target, and is calculated on the basis of a link length and taking into account the road attributes, road type, road width, number of lanes, gradient, traffic conditions, etc., of the link. Particularly, in the present embodiment, as will be described later, the above-described node cost and link cost are corrected based on location data 35 of a location set as a destination.

Note that a route search process may be performed by an external server that is communicably connected to the navigation device 1. In a case in which the external server performs a route search process, when a destination is set on the navigation device 1 or when a route is re-searched (rerouting), the navigation device 1 transmits to the server device information required for a route search, such as a point of departure, a destination, and a search condition, with a route search request (note, however, that in a case of re-searching, information about a destination does not necessarily need to be transmitted). Then, the server device having received the route search request performs a route search using map information included in the server device, to identify a recommended route from the point of departure to the destination. Thereafter, the server device transmits the identified recommended route to the navigation device 1, which is a source of the request. By this, even when the navigation device 1 has an old version of map information at the time of a route search, or the navigation device 1 does not have map information itself, it becomes possible to set an appropriate guided route, based on the latest version of map information included in the server device.

Meanwhile, the navigation ECU (Electronic Control Unit) 13 is an electronic control unit that performs overall control of the navigation device 1, and includes a CPU 41 serving as a computing device and a control device, and internal storage devices such as a RAM 42 that is used as a working memory when the CPU 41 performs various types of arithmetic processing and that stores route data obtained when a route is searched for, etc., a ROM 43 having recorded therein a route search processing program which will be described later (see FIG. 6), etc., in addition to a program for control, and a flash memory 44 that stores a program read from the ROM 43. Note that the navigation ECU 13 forms various types of processing algorithms. For example, a location information obtaining unit obtains location data 35 in which an arrival link from which the vehicle can enter a location serving as a destination and an arrival link direction indicating a direction in which the vehicle can enter upon entering the location from the arrival link are associated with the location. A cost correcting unit corrects costs related to the arrival link, based on the obtained location data 35. A route searching unit searches for a route to the destination, using the costs related to the arrival link that are corrected by the cost correcting unit.

The operating part 14 is operated, for example, upon inputting a point of departure which is a travel start location and a destination which is a travel end location, and includes a plurality of operating switches (not shown) such as various types of keys and buttons. Based on a switch signal outputted by, for example, depression of each switch, the navigation ECU 13 performs control to perform corresponding various types of operation. Note that the operating part 14 may have a touch panel provided on the front of the liquid crystal display 15. Note also that the operating part 14 may have a microphone and a voice recognition device.

In addition, on the liquid crystal display 15 there are displayed a map image including a road, traffic information, operation guidance, an operation menu, guidance on keys, a guided route from a point of departure to a destination, guidance information for the guided route, news, weather forecasts, time, e-mails, TV programs, etc. Note that a HUD or an HMD may be used instead of the liquid crystal display 15.

In addition, the speaker 16 outputs audio guidance that provides guidance on travel along a guided route or guidance on traffic information, based on an instruction from the navigation ECU 13.

In addition, the DVD drive 17 is a drive that can read data recorded on a recording medium such as a DVD or a CD. Then, based on the read data, for example, music or video is played back or the map information DB 31 is updated. Note that instead of the DVD drive 17, a card slot for performing reading and writing on a memory card may be provided.

In addition, the communication module 18 is a communication device for receiving traffic information, probe information, weather information, etc., which are transmitted from a traffic information center, e.g., a VICS center or a probe center. The communication module 18 corresponds, for example, to a mobile phone or a DCM.

Figure 6:
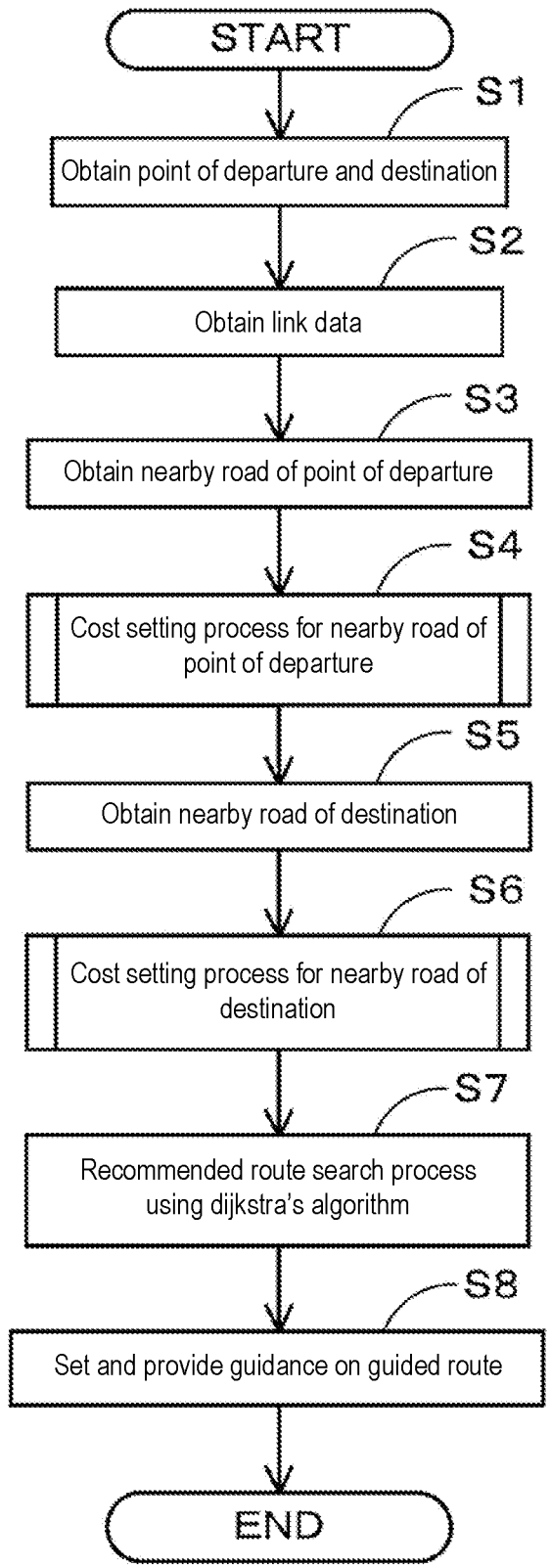
FIG. 6 is a flowchart of a route search processing program according to the present embodiment.
Figure 8:
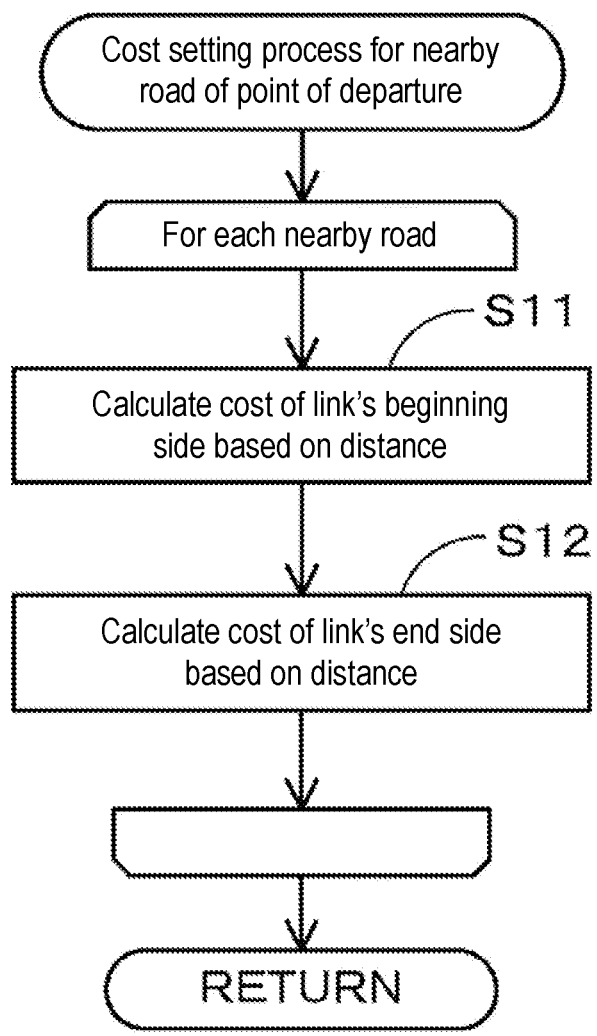
FIG. 8 is a flowchart of a sub-processing program of a cost setting process for a nearby road of a point of departure.
Figure 10:
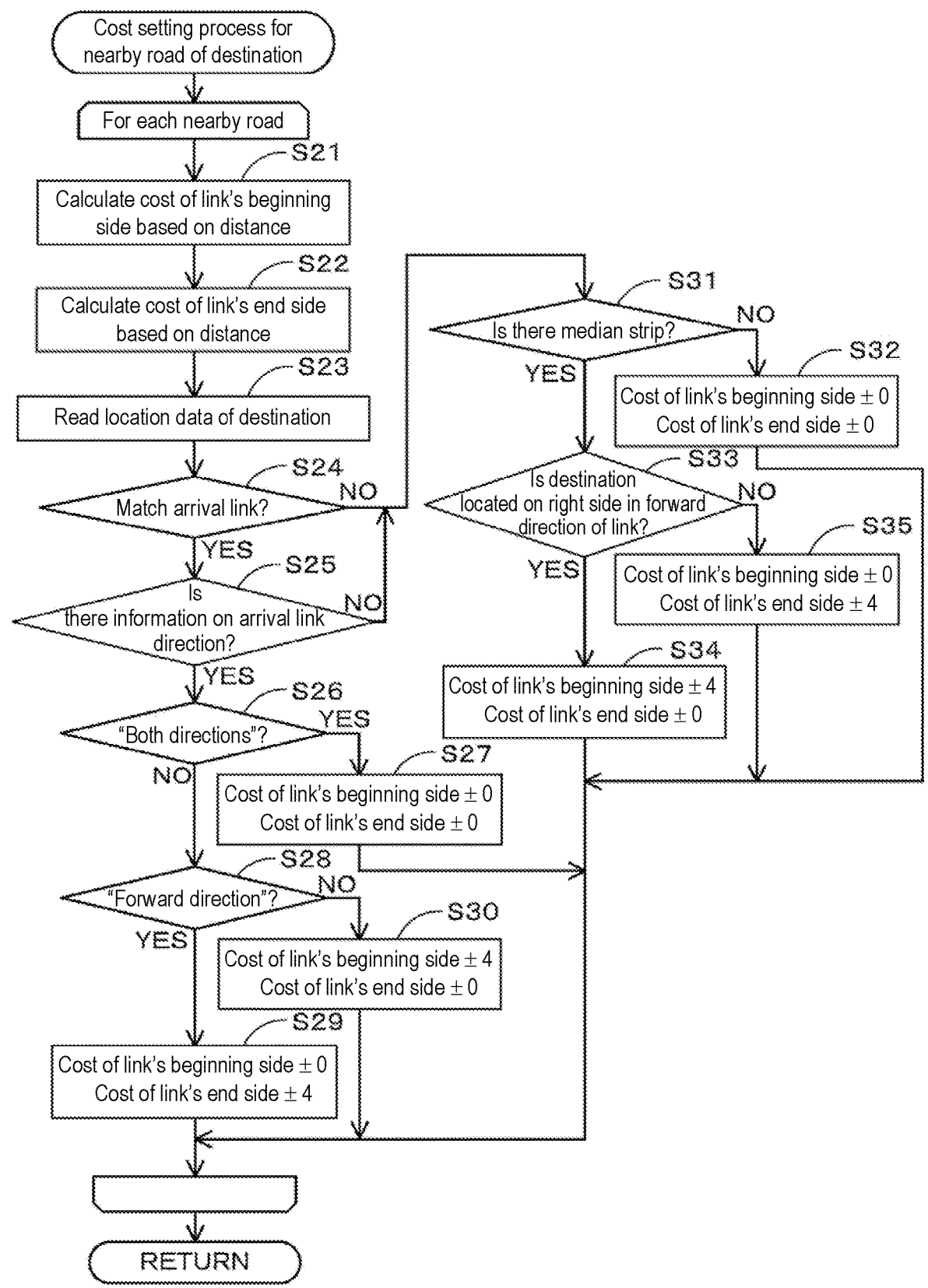
FIG. 10 is a flowchart of a sub-processing program of a cost setting process for a nearby road of a destination.

Next, a route search processing program executed by the CPU 41 in the navigation device 1 according to the present embodiment that has the above-described configuration will be described based on FIG. 6. FIG. 6 is a flowchart of the route search processing program according to the present embodiment. Here, the route search processing program is a program that is executed when a predetermined operation for performing a route search is accepted on the navigation device 1, and that searches for a recommended route from a point of departure to a destination. Note that the program shown in flowcharts of the following FIGS. 6, 8, and 10 is stored in the RAM 42 or the ROM 43 included in the navigation device 1, and executed by the CPU 41.

First, in the route search processing program, at step (hereinafter, abbreviated as S) 1, the CPU 41 obtains a point of departure and a destination of a route which is a search target. Note that the point of departure may be a current location of the vehicle, or may be an arbitrary location specified by the user (e.g., a user's home). Note also that the destination is set based on a user's operation accepted by the operating part 14 (e.g., an operation for retrieving a registered location or an operation for searching and selecting a facility).

Then, at S2, the CPU 41 obtains link data 33 of each link that is located between the point of departure and the destination and that can be included in a recommended route, from the map information DB 31. Each piece of link data 33 includes information that affects a link cost (a road width, a gradient, the number of lanes, a road type, etc.), in addition to a link length that forms the basis of the link cost.

Figure 7:
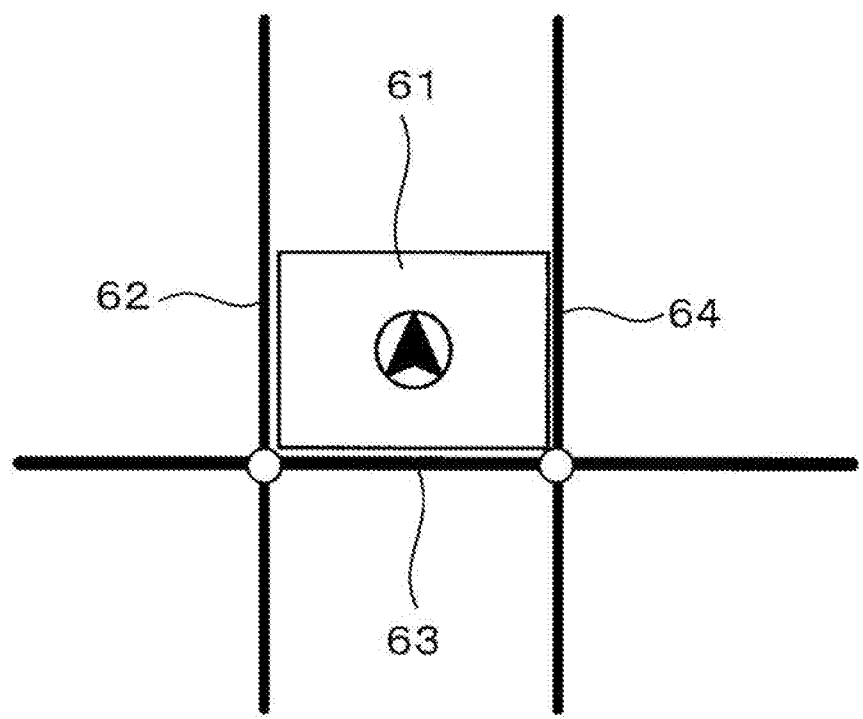
FIG. 7 is a diagram describing nearby roads.

Subsequently, at S3, the CPU 41 obtains a nearby road of the point of departure, based on the point of departure obtained at the above-described point of departure and destination obtained in S1 and map information stored in the map information DB 31. The nearby road of the point of departure is a road serving as a start location of a route in a route search, and is identified on a link-by-link basis. For example, when the point of departure is located on a link, the link serves as a nearby road of the point of departure. On the other hand, when the point of departure is not located on a link, a link onto which the vehicle can exit upon exiting onto the link from the point of departure serves as a nearby road of the point of departure. For example, when the point of departure (e.g., a current location of the vehicle) is a user's home or a small-scale facility, one or two links facing the user's home or facility (two links when the user's home or facility is located at a corner of an intersection) are obtained as nearby roads. Note, however, that there is also a case in which when, as shown in FIG. 7, the point of departure (e.g., a current location of the vehicle) is in a large-scale facility 61, three or more nearby roads are obtained. For example, in an example shown in FIG. 7, three links 62 to 64 adjacent to the facility 61 are obtained as nearby roads.

Then, at step S4, the CPU 41 performs a cost setting process (FIG. 8) for the nearby road of the point of departure which will be described later. Note that the cost setting process for the nearby road of the point of departure is a process of setting a link cost and node costs for the nearby road of the point of departure.

Thereafter, at S5, the CPU 41 obtains a nearby road of the destination, based on the destination obtained at the above-described S1 and the map information stored in the map information DB 31. The nearby road of the destination is a road serving as an end location of the route in the route search, and is identified on a link-by-link basis. For example, when the destination is located on a link, the link serves as a nearby road of the destination. On the other hand, when the destination is not located on a link, a link from which the vehicle can enter upon entering the destination from the link serves as a nearby road of the destination. For example, when the destination is the user's home or a small-scale facility, one or two links facing the user's home or facility (two links when the user's home or facility is located at a corner of an intersection) are obtained as nearby roads. Note, however, that there is also a case in which when, as in the case of the point of departure, the destination is a large-scale facility, three or more nearby roads are obtained. Note that when location data 35 of a location serving as the destination stores information about an arrival link, the arrival link may be obtained also as a nearby road of the destination.

Then, at S6, the CPU 41 performs a cost setting process (FIG. 10) for the nearby road of the destination which will be described later. Note that the cost setting process for the nearby road of the destination is a process of setting a link cost and node costs for the nearby road of the destination, taking into account the location data 35 of a location serving as the destination.

Thereafter, at S7, the CPU 41 searches for a recommended route from the point of departure to the destination by performing a route search process that uses Dijkstra's algorithm. The route search process that uses Dijkstra's algorithm is already known, but an example thereof will be described below.

(1) First, among nodes whose minimum costs for reaching the nodes from the point of departure are not yet determined (the point of departure and the destination are also treated as nodes. Note, however, that when the point of departure is not located on a link, a location on a link where the vehicle can exit upon exiting onto a nearby road from the point of departure is assumed to be the point of departure, and when the destination is not located on a link, a location on a link where the vehicle can enter upon entering the destination from the link is assumed to be the destination), a node whose cost for reaching the node is minimum at the present time (hereinafter, referred to as reference node) is obtained. Note that at first the point of departure serves as the reference node.

(2) Then, a node connected to the reference node through a link (hereinafter, referred to as adjacent node) is identified.

(3) Thereafter, costs for reaching the adjacent node from the point of departure through the reference node are calculated based on a link cost of the link between the reference node and the adjacent node and an intersection cost (node cost) of the reference node, and are associated with the adjacent node. When there are a plurality of adjacent nodes, costs are calculated for each of the plurality of adjacent nodes. Note that for a node having costs already associated therewith, only when smaller costs are calculated, the costs are updated to the calculated costs. In the present embodiment, the link cost is basically a link length (e.g., units of km) and is corrected as appropriate based on a road width, a gradient, the number of lanes, a road type, traffic information, etc. In addition, link costs and node costs of the nearby road of the point of departure and the nearby road of the destination are set at the above-described S4 and S6.

(4) Thereafter, if there is a node whose minimum costs for reaching the node from the point of departure are not yet determined, then processing returns to the above-described (1).

(5) Then, at a point in time when minimum costs for reaching the destination are determined, a route having the minimum costs is identified as a recommended route.

Note that although in the above-described example the route search process is performed from a point of departure side, the route search process may be performed from a destination side. Furthermore, the route search process may be performed from both the point of departure side and the destination side. In addition, a plurality of routes may be searched for by changing a route search condition. For example, when "general priority" is used as the search condition, the above-described route search process is performed by making a correction so as to increase the link cost of a toll road. In addition, when "toll priority" is used as the search condition, the above-described route search process is performed by making a correction so as to reduce the link cost of a toll road.

Thereafter, at S8, the CPU 41 provides the user with guidance on the recommended route searched for at the above-described S7 through the liquid crystal display 15, etc. Note that the number of routes whose guidance is to be provided does not necessarily need to be one, and the configuration may be such that guidance is also provided on a plurality of route candidates which are searched for by changing the search condition (e.g., general priority and toll priority), in addition to a recommended route. Subsequently, the CPU 41 sets a recommended route that is determined based on a user's final determination operation, as a guided route of the navigation device 1. Thereafter, the navigation device 1 provides travel guidance based on the set guided route.

Next, a sub-process of the cost setting process for the nearby road of the point of departure which is performed at the above-described S4 will be described based on FIG. 8. FIG. 8 is a flowchart of a sub-processing program of the cost setting process for the nearby road of the point of departure.

Note that the following processes at S11 and S12 are performed for each link corresponding to a nearby road of the point of departure which is obtained at the above-described S3, and after performing the processes at S11 and S12 for all corresponding links, processing transitions to S5.

Figure 9:
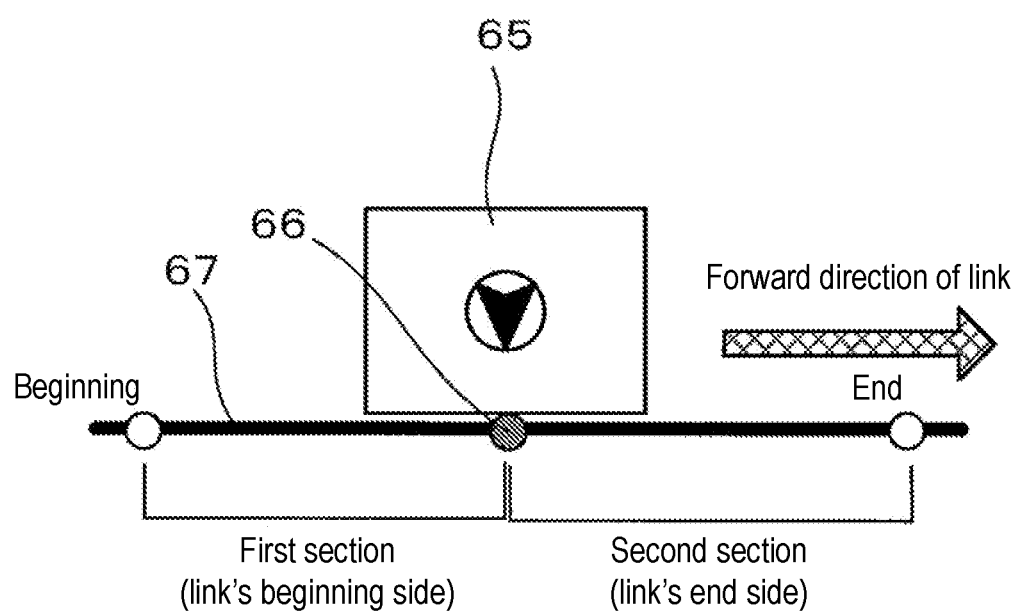
FIG. 9 is a diagram describing a method of setting costs for the nearby road of the point of departure.

First, at S11, the CPU 41 divides a link corresponding to a nearby road of the point of departure into a first section starting from the beginning (a starting point in a forward direction) of the link to the point of departure, and a second section starting from the end (an ending point in the forward direction) of the link to the point of departure. Note that when the point of departure is not located on a link, division into a first section and a second section is performed at a location on a link where the vehicle can exit upon exiting onto a nearby road from the point of departure. Division into a first section and a second section may be performed at a point of intersection of a perpendicular line drawn from the point of departure to a road onto which the vehicle exits and the road. For example, in an example shown in FIG. 9, a location on a link where the vehicle can exit onto a nearby road from a facility 65 including a point of departure is a point 66, and thus, a link 67 corresponding to the nearby road is divided into a first section and a second section, using the point 66 as a boundary.

Thereafter, the CPU 41 calculates a link cost of the first section based on the length of the first section. In the present embodiment, the link cost of the first section is basically the length of the first section (e.g., units of km) and is corrected as appropriate based on a road width, a gradient, the number of lanes, a road type, traffic information, etc.

Likewise, at S12, the CPU 41 calculates a link cost of the second section based on the length of the second section. In the present embodiment, the link cost of the second section is basically the length of the second section (e.g., units of km) and is corrected as appropriate based on a road width, a gradient, the number of lanes, a road type, traffic information, etc.

Thereafter, link costs of a first section and a second section are calculated in the same manner for a link corresponding to a nearby road of the point of departure. Thereafter, processing transitions to S5 of FIG. 6. Then, when cost computation is performed in the route search process at the above-described S7 of FIG. 6, the cost value of a portion from the point of departure to an adjacent node (i.e., the beginning and end of a link corresponding to the nearby road of the point of departure) is calculated based on the link costs of the above-described first and second sections.

Next, a sub-process of the cost setting process for the nearby road of the destination which is performed at the above-described S6 will be described based on FIG. 10. FIG. 10 is a flowchart of a sub-processing program of the cost setting process for the nearby road of the destination.

Note that the following processes at S21 to S35 are performed for each link corresponding to a nearby road of the destination which is obtained at the above-described S5 of FIG. 6, and after performing the processes at S21 to S35 for all corresponding links, processing transitions to S7 of FIG. 6.

Figure 11:
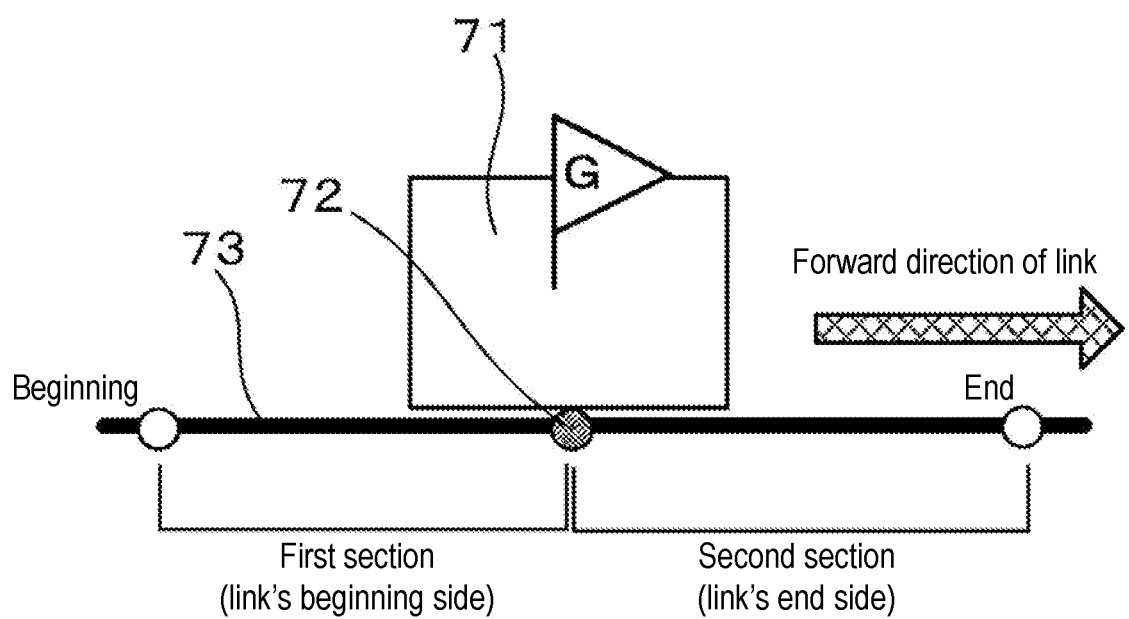
FIG. 11 is a diagram describing a method of setting costs for the nearby road of the destination.
Figure 12:
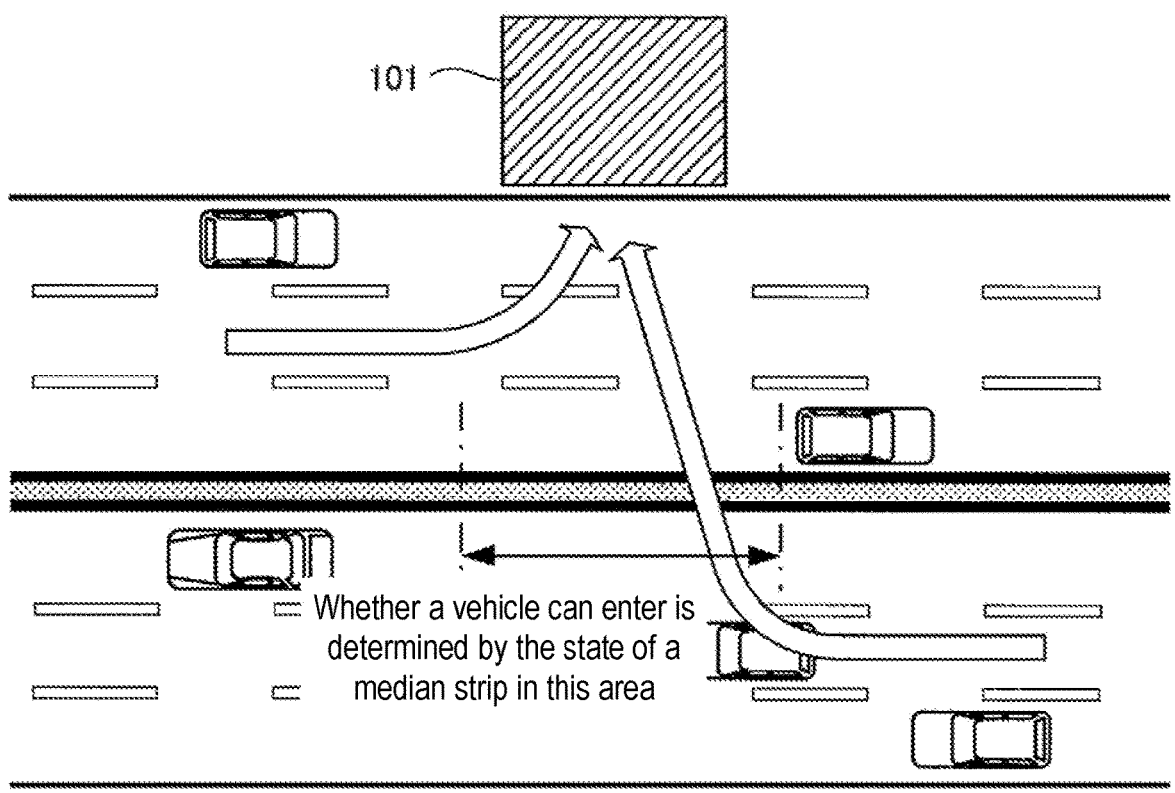
FIG. 12 is a diagram describing a problem of a conventional technique.

First, at S21, the CPU 41 divides a link corresponding to a nearby road of the destination into a first section starting from the beginning (a starting point in a forward direction) of the link to the destination, and a second section starting from the end (an ending point in the forward direction) of the link to the destination. Note that when the destination is not located on a link, division into a first section and a second section is performed at a location on a link where the vehicle can enter upon entering the destination from the link. Particularly, when the destination is a facility and information about an arrival point is included as location data 35, division into a first section and a second section is performed at the arrival point (FIGS. 2 to 5). For example, in an example shown in FIG. 11, an arrival point for a facility 71 serving as a destination is a point 72, and thus, a link 73 corresponding to a nearby road is divided into a first section and a second section, using the point 72 as a boundary.

Thereafter, the CPU 41 calculates a link cost of the first section based on the length of the first section. In the present embodiment, the link cost of the first section is basically the length of the first section (e.g., units of km) and is corrected as appropriate based on a road width, a gradient, the number of lanes, a road type, traffic information, etc. Furthermore, as will be described later, the link cost of the first section is corrected as appropriate, based on location data 35 of a location serving as the destination.

Likewise, at S22, the CPU 41 calculates a link cost of the second section based on the length of the second section. In the present embodiment, the link cost of the second section is basically the length of the second section (e.g., units of km) and is corrected as appropriate based on a road width, a gradient, the number of lanes, a road type, traffic information, etc. Furthermore, as will be described later, the link cost of the second section is corrected as appropriate, based on the location data 35 of the location serving as the destination.

Then, at S23, the CPU 41 reads location data 35 of a location serving as the destination from the map information DB 31. As described above, the location data 35 includes information about a facility name, an address, a phone number, a representative point, and an arrival point (see FIGS. 2 to 5).

Subsequently, at S24, the CPU 41 determines whether the processing-target link of the nearby road matches an arrival link associated with the location serving as the destination, by referring to the location data 35 of the location serving as the destination which is read at the above-described S23. Note that, as described above, there is also a case in which some locations are associated with a plurality of arrival links (see FIG. 5), and in that case, it is determined whether the processing-target link matches any of the associated arrival links.

Then, if it is determined that the processing-target link of the nearby road matches the arrival link associated with the location serving as the destination (S24: YES), processing transitions to S25. On the other hand, if it is determined that the processing-target link of the nearby road does not match the arrival link associated with the location serving as the destination (S24: NO), processing transitions to S31.

At S25, the CPU 41 determines whether an arrival link direction is associated with the arrival link that matches the processing-target link of the nearby road, by referring to the location data 35 of the location serving as the destination which is read at the above-described S23. Note that, as described above, the arrival link direction indicates a direction in which the vehicle can enter upon entering a corresponding location from an arrival link, and basically, any one of "both directions", "forward direction", and "backward direction" is associated. Note, however, that there is also a location with which an arrival link or an arrival link direction is not associated for a reason such as lack of information.

Then, if it is determined that an arrival link direction is associated with the arrival link that matches the processing-target link of the nearby road (S25: YES), processing transitions to S26. On the other hand, if it is determined that an arrival link direction is not associated with the arrival link that matches the processing-target link of the nearby road (S25: NO), processing transitions to S31.

Subsequently, at S26, the CPU 41 determines whether the arrival link direction associated with the arrival link that matches the processing-target link of the nearby road is "both directions".

Then, if it is determined that the arrival link direction associated with the arrival link that matches the processing-target link of the nearby road is "both directions" (S26: YES), processing transitions to S27. On the other hand, if it is determined that the arrival link direction associated with the arrival link that matches the processing-target link of the nearby road is not "both directions" (S26: NO), processing transitions to S28.

At S27, the CPU 41 ends the step without correcting node costs set at end points of the processing-target link corresponding to the nearby road. Namely, when a facility that the vehicle can enter in both directions, the forward and backward directions, of a link such as that shown in FIG. 2 is the destination, since there is no need to particularly prioritize any route that the vehicle enters in either direction, a cost correction is not made.

On the other hand, at S28, the CPU 41 determines whether the arrival link direction associated with the arrival link that matches the processing-target link of the nearby road is "forward direction".

Then, if it is determined that the arrival link direction associated with the arrival link that matches the processing-target link of the nearby road is "forward direction (i.e., a direction going to the destination from the beginning of the link)" (S28: YES), processing transitions to S29. On the other hand, if it is determined that the arrival link direction associated with the arrival link that matches the processing-target link of the nearby road is "backward direction (i.e., a direction going to the destination from the end of the link)" (S28: NO), processing transitions to S30.

At S29, the CPU 41 does not correct a node cost (first node cost) set at the beginning of the processing-target link corresponding to the nearby road, but makes a correction to add a cost value to a node cost (second node cost) set at the end of the link. For example, a predetermined value (e.g., 4 km) is added to the node cost set at the end of the link. Note that in a process for increasing the node cost, in addition to the addition, a predetermined coefficient may be multiplied.

Furthermore, the amount of increase in node cost may be changed depending on the number of opposite lanes of the nearby road (i.e., the number of lanes that the vehicle needs to cross in order to enter the destination). For example, the amount of increase in node cost increases as the number of lanes increases. In addition, instead of increasing the node cost set at the end of the link, the node cost set at the beginning of the link may be reduced. Furthermore, at the above-described S29, instead of the node cost, a link cost may be corrected. Namely, a correction may be made to add a cost value to the link cost of the second section calculated at the above-described S22. In addition, both the node cost and the link cost may be corrected. As a result, in a recommended route search process (S7) performed thereafter, a route along which the vehicle travels in the forward direction from the beginning of the link and reaches the destination is more likely to be selected as a route to the destination than a route along which the vehicle travels in the backward direction from the end of the link and reaches the destination.

Here, when a facility that the vehicle can enter only in one direction of a link such as that shown in FIGS. 3 and 4 is the destination, there is a need to prioritize a route for entering in a direction in which the vehicle can enter. Therefore, at the above-described S29, the costs are corrected such that a route along which the vehicle travels on the arrival link in the arrival link direction (the forward direction at S29) and reaches the destination is likely to be included as a route to the destination.

On the other hand, at S30, the CPU 41 makes a correction to add a cost value to the node cost (first node cost) set at the beginning of the processing-target link corresponding to the nearby road, but does not correct the node cost (second node cost) set at the end of the link. For example, a predetermined value (e.g., 4 km) is added to the node cost set at the beginning of the link. Note that in a process for increasing the node cost, in addition to the addition, a predetermined coefficient may be multiplied. Furthermore, the amount of increase in node cost may be changed depending on the number of opposite lanes of the nearby road (i.e., the number of lanes that the vehicle needs to cross in order to enter the destination). For example, the amount of increase in node cost increases as the number of lanes increases. In addition, instead of increasing the node cost set at the beginning of the link, the node cost set at the end of the link may be reduced. Furthermore, at the above-described S30, instead of the node cost, the link cost may be corrected. Namely, a correction may be made to add a cost value to the link cost of the first section calculated at the above-described S21. In addition, both the node cost and the link cost may be corrected. As a result, in a recommended route search process (S7) performed thereafter, a route along which the vehicle travels in the backward direction from the end of the link and reaches the destination is more likely to be selected as a route to the destination than a route along which the vehicle travels in the forward direction from the beginning of the link and reaches the destination.

Here, when a facility that the vehicle can enter only in one direction of a link such as that shown in FIGS. 3 and 4 is the destination, there is a need to prioritize a route for entering in a direction in which the vehicle can enter. Therefore, at the above-described S30, the costs are corrected such that a route along which the vehicle travels on the arrival link in the arrival link direction (the backward direction at S30) and reaches the destination is likely to be included as a route to the destination.

On the other hand, at S31, the CPU 41 determines whether the processing-target link of the nearby road has a median strip, by referring to link data 33 of the processing-target link of the nearby road. Note that even when the link data 33 represents that the processing-target link of the nearby road has a median strip, if the percentage of the median strip occupied (placed) in the entire link is less than a threshold value (e.g., less than 50%), then even if the link partly includes a median strip, it is highly likely that there is no median strip at a location facing the destination, and thus, it may be considered that the link does not have a median strip.

Then, if it is determined that the processing-target link of the nearby road has a median strip (S31: YES), processing transitions to S33. On the other hand, if it is determined that the processing-target link of the nearby road does not have a median strip (S31: NO), processing transitions to S32.

At S32, the CPU 41 ends the step without correcting the node costs set at the end points of the processing-target link corresponding to the nearby road. Namely, a facility located along a road with no median strip such as that shown in FIG. 2 can be estimated to be a facility that the vehicle can enter in both directions, the forward and backward directions, of the link even if location data 35 of the facility cannot be referred to. Therefore, since there is no need to particularly prioritize any route that the vehicle enters in either direction, a cost correction is not made.

On the other hand, at S33, the CPU 41 determines whether the destination is located on the right side in the forward direction of the link.

Then, if it is determined that the destination is located on the right side in the forward direction of the link (S33: YES), processing transitions to S34. On the other hand, if it is determined that the destination is located on the left side in the forward direction of the link (S33: NO), processing transitions to S35.

At S34, the CPU 41 makes a correction to add a cost value to the node cost (first node cost) set at the beginning of the processing-target link corresponding to the nearby road, but does not correct the node cost (second node cost) set at the end of the link. For example, a predetermined value (e.g., 4 km) is added to the node cost set at the beginning of the link. Note that in a process for increasing the node cost, in addition to the addition, a predetermined coefficient may be multiplied. Furthermore, the amount of increase in node cost may be changed depending on the number of opposite lanes of the nearby road (i.e., the number of lanes that the vehicle needs to cross in order to enter the destination). For example, the amount of increase in node cost increases as the number of lanes increases. In addition, instead of increasing the node cost set at the beginning of the link, the node cost set at the end of the link may be reduced. Furthermore, at the above-described S34, instead of the node cost, the link cost may be corrected. Namely, a correction may be made to add a cost value to the link cost of the first section calculated at the above-described S21. In addition, both the node cost and the link cost may be corrected. As a result, in a recommended route search process (S7) performed thereafter, a route along which the vehicle travels in the backward direction from the end of the link and reaches the destination is more likely to be selected as a route to the destination than a route along which the vehicle travels in the forward direction from the beginning of the link and reaches the destination.

Here, a facility located along a road with a median strip such as that shown in FIG. 4 can be estimated to be a facility that the vehicle can enter only in one direction of a link even if location data 35 of the facility cannot be referred to. For example, the facility 57 located on the right side in the forward direction of the link can be estimated to be a facility that the vehicle can enter only in the backward direction of the link. Therefore, at the above-described S34, the costs are corrected such that a route along which the vehicle travels on the nearby road in the backward direction and reaches the destination is likely to be included as a route to the destination.

On the other hand, at S35, the CPU 41 does not correct the node cost (first node cost) set at the beginning of the processing-target link corresponding to the nearby road, but makes a correction to add a cost value to the node cost (second node cost) set at the end of the link. For example, a predetermined value (e.g., 4 km) is added to the node cost set at the end of the link. Note that in a process for increasing the node cost, in addition to the addition, a predetermined coefficient may be multiplied. Furthermore, the amount of increase in node cost may be changed depending on the number of opposite lanes of the nearby road (i.e., the number of lanes that the vehicle needs to cross in order to enter the destination). For example, the amount of increase in node cost increases as the number of lanes increases. In addition, instead of increasing the node cost set at the end of the link, the node cost set at the beginning of the link may be reduced. Furthermore, at the above-described S29, instead of the node cost, the link cost may be corrected. Namely, a correction may be made to add a cost value to the link cost of the second section calculated at the above-described S22. In addition, both the node cost and the link cost may be corrected. As a result, in a recommended route search process (S7) performed thereafter, a route along which the vehicle travels in the forward direction from the beginning of the link and reaches the destination is more likely to be selected as a route to the destination than a route along which the vehicle travels in the backward direction from the end of the link and reaches the destination.

Here, a facility located along a road with a median strip such as that shown in FIG. 4 can be estimated to be a facility that the vehicle can enter only in one direction of a link even if location data 35 of the facility cannot be referred to. For example, the facility 56 located on the left side in the forward direction of the link can be estimated to be a facility that the vehicle can enter only in the forward direction of the link. Therefore, at the above-described S35, the costs are corrected such that a route along which the vehicle travels on the nearby road in the forward direction and reaches the destination is likely to be included as a route to the destination.

Thereafter, link costs of a first section and a second section and nodes costs of end points of a link are calculated in the same manner for a link corresponding to a nearby road of the destination. Thereafter, processing transitions to S7. Then, when cost computation is performed in the route search process at the above-described S7, the cost value of a portion from the beginning of a link corresponding to the nearby road of the destination to the destination is calculated based on the link cost of the above-described first section and the node cost set at the beginning of the link. On the other hand, the cost value of a portion from the end of the link corresponding to the nearby road of the destination to the destination is calculated based on the link cost of the above-described second section and the node cost set at the end of the link.

As described in detail above, the navigation device 1 and a computer program executed by the navigation device 1 according to the present embodiment obtain location data 35 in which an arrival link from which the vehicle can enter a location serving as a destination and an arrival link direction indicating a direction in which the vehicle can enter upon entering the location from the arrival link are associated with the location (S23), correct a cost related to the arrival link, based on the obtained location data 35 (S27, S29, and S30), and search for a route to the destination, using the corrected cost related to the arrival link (S7). Thus, it becomes possible to perform a route search, taking into account a direction in which the vehicle can enter the destination, without significantly increasing the amount of data or a processing load associated with the route search. As a result, it becomes possible to perform a more optimal route search to the destination.

Note that the present disclosure is not limited to the above-described embodiment, and it is, of course, possible to make various modifications and changes without departing from the spirit and scope of the present disclosure.

For example, although in the present embodiment the navigation device 1 performs a route search process, an external server communicably connected to the navigation device 1 may perform a route search process. In a case in which the external server performs a route search process, when a destination is set on the navigation device 1 or when a route is re-searched (rerouting), the navigation device 1 transmits to the server device information required for a route search, such as a point of departure, a destination, and a search condition, with a route search request.

In addition, although in the present embodiment location data is described using, particularly, an example of location data about a facility, it is also possible to allow locations other than facilities to have location data. Locations that are allowed to have location data include, in addition to facilities, points (e.g., place names and addresses) on a map that can serve as a point of departure, a destination, a guidance target, etc.

In addition, although in the present embodiment description is made assuming particularly a case of a country that drives on the left side of the road, aspects of the present disclosure can also be implemented in the same manner in countries that drive on the right side of the road. For example, a facility with "no right turn entry" in countries that drive on the left side of the road corresponds to a facility with "no left turn entry" in countries that drive on the right side of the road. In location data 35 of a facility with "no left turn entry", an entry direction for entering from an arrival link by making a right turn is associated as an arrival link direction.

In addition, although in the present embodiment the length of a link is used as the reference value of a link cost, the travel time of the link may be used as the reference value of the link cost.

In addition, the present disclosure can be applied to devices having a route search function, in addition to navigation devices. For example, the present disclosure can also be applied to mobile phones, smartphones, tablet terminals, personal computers, etc. (hereinafter, referred to as portable terminals, etc.). In addition, the present disclosure can also be applied to a system including a server and portable terminals, etc. In that case, each step of the above-described route search processing program (FIG. 6) may be configured to be performed by either the server or the portable terminals, etc. In addition, when the present disclosure is applied to portable terminals, etc., the various aspects of the disclosure can also be applied to a route search for moving objects other than vehicles, e.g., users of the portable terminals, etc., and two-wheeled vehicles.

In addition, although an implementation example in which a route searching device according to the present disclosure is embodied is described above, the route searching device can also have the following configurations, and provides, in that case, the following advantageous effects.

For example, a first configuration is as follows:

A route searching device (1) that performs a route search using costs related to links included in a route includes: a location information obtaining unit (41) for obtaining location information (35) in which an arrival link from which a vehicle can enter a location serving as a destination and an arrival link direction indicating a traveling direction of the arrival link in which the vehicle can enter upon entering the location from the arrival link are associated with the location; a cost correcting unit (41) for correcting a cost related to the arrival link, based on the location information; and a route searching unit (41) for searching for a route to the destination, using the cost related to the arrival link that is corrected by the cost correcting unit.

According to the route searching device having the above-described configuration, location information of a location that can serve as a destination has an arrival link from which the vehicle can enter the location and an arrival link direction indicating a traveling direction of the arrival link in which the vehicle can enter upon entering the location from the arrival link, by which it becomes possible to perform a route search, taking into account a direction in which the vehicle can enter the destination, without significantly increasing the amount of data or a processing load associated with the route search. As a result, it becomes possible to perform a more optimal route search to the destination.

In addition, a second configuration is as follows:

The cost correcting unit (41) corrects a cost such that a route along which the vehicle travels on the arrival link in the arrival link direction and reaches the destination is likely to be included as a route to the destination.

According to the route searching device having the above-described configuration, it becomes possible to select, on a priority basis, a route along which the vehicle travels in a direction in which the vehicle can enter the destination and reaches the destination, as a route to the destination.

In addition, a third configuration is as follows:

The cost correcting unit (41) corrects the cost related to the arrival link such that a cost for traveling on the arrival link in the arrival link direction is lower than a cost for traveling in an opposite direction to the arrival link direction.

According to the route searching device having the above-described configuration, it becomes possible to select, on a priority basis, a route along which the vehicle travels on the arrival link in the arrival link direction, i.e., a direction in which the vehicle can enter the destination and reaches the destination, as a route to the destination.

In addition, a fourth configuration is as follows:

When a direction going to the destination from one end point of the arrival link matches the arrival link direction and a direction going to the destination from the other end point of the arrival link does not match the arrival link direction, the cost correcting unit (41) corrects a cost such that a route from the one end point of the arrival link to the destination is likely to be included as a route to the destination.

According to the route searching device having the above-described configuration, it becomes possible to select, on a priority basis, a route along which the vehicle travels on the arrival link in the arrival link direction, i.e., a direction in which the vehicle can enter the destination and reaches the destination, as a route to the destination.

In addition, a fifth configuration is as follows:

The cost related to the arrival link includes a first node cost set at one end point of the arrival link; and a second node cost set at the other end point of the arrival link, and the cost correcting unit (41) corrects at least one of the first node cost and the second node cost.

According to the route searching device having the above-described configuration, by correcting at least one of the node costs of end portions of the arrival link, it becomes possible to select, on a priority basis, a more appropriate route according to the destination out of a route along which the vehicle travels to the destination from one end point of the arrival link and a route along which the vehicle travels to the destination from the other end point of the arrival link, as a route to the destination.

In addition, a sixth configuration is as follows:

A location that does not allow a right turn entry is associated with a traveling direction of an arrival link for entering from the arrival link by making a left turn, as the arrival link direction.

According to the route searching device having the above-described configuration, for example, when a location that the vehicle cannot enter by making a right turn in a country that drives on the left side of the road is a destination, it becomes possible to select, on a priority basis, a route along which the vehicle can enter the destination by making a left turn, as a route to the destination.

In addition, a seventh configuration is as follows:

A location that does not allow a left turn entry is associated with a traveling direction of an arrival link for entering from the arrival link by making a right turn, as the arrival link direction.

According to the route searching device having the above-described configuration, for example, when a location that the vehicle cannot enter by making a left turn in a country that drives on the right side of the road is a destination, it becomes possible to select, on a priority basis, a route along which the vehicle can enter the destination by making a right turn, as a route to the destination.

In addition, an eighth configuration is as follows:

When arrival links associated with the location serving as the destination are a plurality of links that are divided for each traveling direction, for each of the plurality of links, an arrival link direction indicating a traveling direction of the link in which the vehicle can enter upon entering the location serving as the destination from the link is associated as the arrival link direction.

According to the route searching device having the above-described configuration, even when a location located along a road including a plurality of links which are divided for each traveling direction, such as dual lines, is a destination, it becomes possible to perform a route search, taking into account directions in which the vehicle can enter the destination from each link. As a result, it becomes possible to perform a more optimal route search to the destination.

In addition, a ninth configuration is as follows:

The location serving as the destination is a facility.

According to the route searching device having the above-described configuration, facility information of a facility has an arrival link from which the vehicle can enter the facility and an arrival link direction indicating a direction in which the vehicle can enter upon entering the facility from the arrival link, by which it becomes possible to perform a route search, taking into account a direction in which the vehicle can enter the destination, without significantly increasing the amount of data or a processing load associated with the route search. As a result, it becomes possible to perform a more optimal route search to the destination.

What is claimed is:

1. A route searching system that performs a route search using costs related to links included in a route, the route searching system comprising:
    a location information obtaining unit executing on at least one processor that obtains, from a map information database, location information of a location serving as a destination which is not located on a road, the location information associating with the location an arrival link from which a vehicle can enter the location, the location information including an arrival link direction of the arrival link, the arrival link direction indicating a traveling direction in which the vehicle can travel to enter the location from the arrival link;
    a cost correcting unit executing on the at least one processor that corrects a cost related to the arrival link, based on the location information of the destination;
    a route searching unit executing on the at least one processor that searches for a route to the destination, based on the cost related to the arrival link after correction by the cost correcting unit;
    an output unit executing on the at least one processor configured to display the route to the destination on a display, or output audio directions of the route to the destination; and
    a non-transitory computer-readable storage device storing thereon the map information database, the storage device being communicatively coupled to the location information obtaining unit, the storage device being configured to store, in the map information database:
        a plurality of link data pieces each describing a link forming a portion of a road, and
        a plurality of location data pieces each describing a destination location, at least one location data piece associated with at least one arrival link data piece of the plurality of link data pieces, at least one location data piece describing an arrival link direction for the arrival link data piece associated therewith.

2. The route searching system according to claim 1, wherein the cost correcting unit corrects a cost such that the route along which the vehicle travels on the arrival link in the arrival link direction and reaches the destination is likely to be included as the route to the destination.

3. The route searching system according to claim 2, wherein the cost correcting unit corrects the cost related to the arrival link such that a cost for traveling on the arrival link in the arrival link direction is lower than a cost for traveling in an opposite direction to the arrival link direction.

4. The route searching system according to claim 2, wherein when a direction going to a destination from one end point of the arrival link matches the arrival link direction and a direction going to a destination from an other end point of the arrival link does not match the arrival link direction, the cost correcting unit corrects a cost such that the route from the one end point of the arrival link to a destination is more likely to be included as the route to a destination as compared to the other end point of the arrival link.

5. The route searching system according to claim 1, wherein
    the cost related to the arrival link includes a first node cost set at one end point of the arrival link; and a second node cost set at an other end point of the arrival link, and
    the cost correcting unit corrects at least one of the first node cost and the second node cost.

6. The route searching system according to claim 1, wherein the location that does not allow a right turn entry is associated with a traveling direction of any arrival link for entering from the arrival link by making a left turn, as the arrival link direction.

7. The route searching system according to claim 1, wherein the location that does not allow a left turn entry is associated with a traveling direction of any arrival link for entering from the arrival link by making a right turn, as the arrival link direction.

8. The route searching system according to claim 1, wherein when arrival links associated with the location serving as a destination are a plurality of links that are divided for each traveling direction, for each of the plurality of links, the arrival link direction indicating a traveling direction of the link in which the vehicle can enter upon entering the location serving as the destination from the link is associated as the arrival link direction.

9. The route searching system according to claim 1, wherein the location serving as the destination is a facility.

10. A computer program for allowing to perform a route search using costs related to links included in a route, the computer program stored on a non-transitory computer readable medium and causing at least one processor to function as:
a location information obtaining unit that obtains, from a map information database stored on a non-transitory computer-readable storage device communicatively coupled to the at least one processor, location information of a location serving as a destination which is not located on a road, the location information associating with the location an arrival link from which a vehicle can enter the location, the location information including an arrival link direction of the arrival link, the arrival link direction indicating a traveling direction in which the vehicle can travel to enter the location from an arrival link;
a cost correcting unit that corrects a cost related to the arrival link, based on the location information of the destination;
a route searching unit that searches for a route to the destination, based on the cost related to the arrival link after correction by the cost correcting unit;
an output unit configured to display the route to the destination on a display, or output audio directions of the route to the destination,
wherein the storage device is configured to store, in the map information database:
a plurality of link data pieces each describing a link forming a portion of a road, and
a plurality of location data pieces each describing a destination location, at least one location data piece associated with at least one arrival link data piece of the plurality of link data pieces, at least one location data piece describing an arrival link direction for the arrival link data piece associated therewith.

11. The computer program according to claim 10, wherein the cost correcting unit corrects a cost such that the route along which the vehicle travels on the arrival link in the arrival link direction and reaches the destination is likely to be included as the route to the destination.

12. The computer program according to claim 11, wherein the cost correcting unit corrects the cost related to the arrival link such that a cost for traveling on the arrival link in the arrival link direction is lower than a cost for traveling in an opposite direction to the arrival link direction.

13. The computer program according to claim 11, wherein when a direction going to a destination from one end point of the arrival link matches the arrival link direction and a direction going to a destination from an other end point of the arrival link does not match the arrival link direction, the cost correcting unit corrects a cost such that the route from the one end point of the arrival link to a destination is likely to be included as a route to the destination as compared to the other end point of the arrival link.

14. The computer program according to claim 10, wherein
the cost related to the arrival link includes a first node cost set at one end point of the arrival link; and a second node cost set at an other end point of the arrival link, and
the cost correcting unit corrects at least one of the first node cost and the second node cost.

15. The computer program according to claim 10, wherein the location that does not allow a right turn entry is associated with a traveling direction of any arrival link for entering from the arrival link by making a left turn, the arrival link direction.

16. The computer program according to claim 10, wherein the location that does not allow a left turn entry is associated with a traveling direction of any arrival link for entering from the arrival link by making a right turn, the arrival link direction.

17. The computer program according to claim 10, wherein when arrival links associated with the location serving as a destination are a plurality of links that are divided for each traveling direction, for each of the plurality of links, the arrival link direction indicating a traveling direction of the link in which the vehicle can enter upon entering the location serving as the destination from the link is associated as the arrival link direction.

18. The computer program according to claim 10, wherein the location serving as the destination is a facility.

* * * * *